United States Patent
Arai (10) Patent No.: US 10,479,297 B2
(45) Date of Patent: Nov. 19, 2019

(54) CONTROL APPARATUS, PROGRAM UPDATING METHOD, AND COMPUTER PROGRAM

(71) Applicant: SUMITOMO ELECTRIC INDUSTRIES, LTD., Osaka-shi (JP)

(72) Inventor: Koji Arai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/345,552

(22) PCT Filed: Aug. 4, 2017

(86) PCT No.: PCT/JP2017/028448
§ 371 (c)(1),
(2) Date: Apr. 26, 2019

(87) PCT Pub. No.: WO2018/079004
PCT Pub. Date: May 3, 2018

(65) Prior Publication Data
US 2019/0315293 A1 Oct. 17, 2019

(30) Foreign Application Priority Data
Oct. 27, 2016 (JP) .................................. 2016-210140

(51) Int. Cl.
*B60R 16/023* (2006.01)
*G06F 8/65* (2018.01)
(Continued)

(52) U.S. Cl.
CPC ......... *B60R 16/0231* (2013.01); *B60W 10/06* (2013.01); *B60W 30/18018* (2013.01);
(Continued)

(58) Field of Classification Search
CPC . G06F 8/65; G06F 8/654; G06F 8/656; G06F 8/658; G06F 8/66; G06F 8/70;
(Continued)

(56) References Cited

U.S. PATENT DOCUMENTS

2011/0140813 A1* 6/2011 Suzuki .................. F02N 11/087
335/156
2015/0322912 A1* 11/2015 Takizawa ............ F02N 11/0837
701/65
(Continued)

FOREIGN PATENT DOCUMENTS

JP    11-141395 A    5/1999
JP    2003-191803 A    7/2003
(Continued)

*Primary Examiner* — Thomas G Black
*Assistant Examiner* — Sara J Lewandroski
(74) *Attorney, Agent, or Firm* — Baker Botts L.L.P.; Michael A. Sartori (57) ABSTRACT

Provided is a control apparatus configured to control update of a control program of an on-vehicle control device which controls target equipment installed in a vehicle. The control apparatus includes: a determination unit configured to determine whether or not to permit update of the control program, by using, as a criterion, operation of a drive source of the vehicle; and a control unit configured to perform a control to restrict stop of the drive source during permitted update of the control program.

14 Claims, 8 Drawing Sheets

(51) Int. Cl.
*B60W 30/18* (2012.01)
*B60W 10/06* (2006.01)
*G01C 21/34* (2006.01)
*G01C 21/36* (2006.01)

(52) U.S. Cl.
CPC ..... *G01C 21/3407* (2013.01); *G01C 21/3697* (2013.01); *G06F 8/65* (2013.01); *B60W 2550/14* (2013.01); *B60W 2550/20* (2013.01); *B60W 2550/40* (2013.01)

(58) Field of Classification Search
CPC .............. G06F 8/61; B60W 30/18018; B60W 30/18072; G01C 21/34
See application file for complete search history.

(56) References Cited

U.S. PATENT DOCUMENTS

| | | | |
|---|---|---|---|
| 2018/0058410 A1* | 3/2018 | Fujita | F02N 11/0848 |
| 2018/0074811 A1* | 3/2018 | Kiyama | G06F 8/65 |
| 2018/0074813 A1* | 3/2018 | Granda | B60W 50/00 |
| 2018/0102939 A1* | 4/2018 | Kim | H04L 67/34 |
| 2018/0203685 A1* | 7/2018 | Nakamura | G05B 19/0426 |
| 2018/0210722 A1* | 7/2018 | Mori | B60R 16/02 |
| 2018/0321047 A1* | 11/2018 | Sagawa | G01C 21/26 |
| 2019/0108014 A1* | 4/2019 | Nakamura | H04W 4/40 |
| 2019/0111907 A1* | 4/2019 | Harata | B60R 16/02 |

FOREIGN PATENT DOCUMENTS

| | | |
|---|---|---|
| JP | 2007-65856 A | 3/2007 |
| JP | 2010-195119 A | 9/2010 |
| JP | 2010-243339 A | 10/2010 |
| JP | 2011-70287 A | 4/2011 |
| JP | 2011-79496 A | 4/2011 |
| JP | 2016-38634 A | 3/2016 |
| WO | 2007/072735 A1 | 6/2007 |

* cited by examiner

CONTROL APPARATUS, PROGRAM UPDATING METHOD, AND COMPUTER PROGRAM

TECHNICAL FIELD

The present invention relates to a control apparatus, a program updating method, and a computer program.

This application claims priority on Japanese Patent Application No. 2016-210140 filed on Oct. 27, 2016, the entire contents of which are incorporated herein by reference.

BACKGROUND ART

In the automotive field in recent years, vehicles have been progressed in functionality, and a diverse range of devices are installed on vehicles. Accordingly, vehicles are equipped with large numbers of control devices, so-called ECUs (Electronic Control Units), for controlling these on-vehicle devices.

Examples of types of ECUs include: traveling-type ECUs that control an engine, a brake, an EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements a control of an on-vehicle device by reading out a control program stored in a an ROM (Read Only Memory), and executing the read control program.

Control programs of ECUs may differ depending on the shipping destinations, grades, etc., of vehicles. Therefore, old versions of control programs need to be overwritten with new versions of control programs in response to upgrading of control programs.

For example, Patent Literature 1 discloses a technique of remotely executing update of programs of ECUs installed in a vehicle by means of wireless communication. Specifically, a gateway of an on-vehicle communication device or the like receives an update program from a management server, and an ECU overwrites an old version of control program with a new version of control program by using the received update program.

CITATION LIST

Patent Literature

PATENT LITERATURE 1: Japanese Laid-Open Patent Publication No. 2007-65856
PATENT LITERATURE 2: International Publication No. 2007/072735

SUMMARY OF INVENTION

A control apparatus according to one embodiment is a control apparatus configured to control update of a control program of an on-vehicle control device which controls target equipment installed in a vehicle. The control apparatus includes: a determination unit configured to determine whether or not to permit update of the control program, by using, as a criterion, operation of a drive source of the vehicle; and a control unit configured to perform a control to restrict stop of the drive source during permitted update of the control program.

A method according to another embodiment is a method of updating a control program of an on-vehicle control device which controls target equipment installed in a vehicle. The method includes: determining whether or not to permit update of the control program, by using, as a criterion, operation of a drive source of the vehicle; and performing a control to restrict stop of the drive source during permitted update of the control program.

A computer program according to still another embodiment is a computer program for causing a computer to function as a control apparatus configured to control update of a control program of an on-vehicle control device which controls target equipment installed in a vehicle. The computer program causes the computer to function as: a determination unit configured to determine whether or not to permit update of the control program, by using, as a criterion, operation of a drive source of the vehicle; and a control unit configured to perform a control to restrict stop of the drive source during permitted update of the control program.

DESCRIPTION OF EMBODIMENTS

<Problems to be Solved by the Present Disclosure>

While an engine is being operated, a control of automatically stopping the engine, such as idle reduction, may be performed. The engine, which has been automatically stopped due to idle reduction or the like, is automatically started when the engine stopping function is canceled.

A voltage drop occurs when the engine is started. Therefore, if restart of the engine is caused by the aforementioned engine stop while a control program is being updated, a voltage drop occurs during the update of the control program, whereby the update of the program may be interrupted. In this case, the program may be destroyed.

To solve the above problem, Patent Literature 2 discloses a control method in which update of a control program is not performed while an engine is not in an operating state. In the control method of Patent literature 2, however, even if update is started while the engine is being operated, the engine might be stopped during the update and then restarted. Therefore, Patent Literature 2 does not fully solve the above problem.

An object in one aspect of the present disclosure is to provide a control apparatus, a program updating method, and a computer program which are able to stably update a control program while a drive source such as an engine is being operated.

<Effect of the Present Disclosure>

According to this disclosure, it is possible to stably update a control program while a drive source such as an engine is being operated.

[Description of Embodiments]

Embodiments of the present disclosure include at least the following.

That is, a control apparatus included in the embodiments is a control apparatus configured to control update of a control program of an on-vehicle control device which controls target equipment installed in a vehicle. The control apparatus includes: a determination unit configured to determine whether or not to permit update of the control program, by using, as a criterion, operation of a drive source of the vehicle; and a control unit configured to perform a control to restrict stop of the drive source during permitted update of the control program.

According to this configuration, stop of the drive source during update of the control program is restricted. Thus, restart of the drive source during update of the control program is avoided. Therefore, update of the control program is prevented from being interrupted due to a voltage drop that is caused by restart of the drive source during the update, and the update program is prevented from being destroyed due to the interrupted update. As a result, the control program can be stably updated while the drive source such as an engine is being operated.

Preferably, the determination unit permits update of the control program in a case where the drive source is being operated at present.

Thus, the control program is updated while the drive source of the vehicle is being operated.

Preferably, the determination unit does not permit update of the control program, at an estimated stop position which is a position, on a predicted traveling route, where the drive source is estimated to be stopped.

Thus, the likelihood that the drive source is stopped during update of the control program can be reduced. As a result, control to restrict stop of the drive source can be suppressed. Therefore, both stable update of the control program and energy saving can be achieved.

Preferably, the determination unit permits update of the control program at a position where the number of estimated stop positions, at which the drive source is estimated to be stopped, is minimized. This position is included in a section, in the predicted traveling route, where the vehicle travels during update of the control program.

Thus, the likelihood that the drive source is stopped during update of the control program can be reduced. As a result, control to restrict stop of the drive source can be suppressed. Therefore, both stable update of the control program and energy saving can be achieved.

Preferably, the estimated stop position is a position where the drive source is estimated to be stopped, based on map information of the traveling route, and information indicating a topography of the traveling route.

Thus, the position where the drive source will be stopped is estimated with high accuracy.

Preferably, the estimated stop position is a position where the drive source is estimated to be stopped, further based on traffic information of the traveling route.

Thus, the position where the drive source will be stopped is estimated with higher accuracy.

Preferably, in a case where a load regarding update of the control program is not smaller than a predetermined value, the control unit performs the control to restrict stop of the drive source during update of the control program.

Thus, simplified and efficient control can be realized. In addition, since unnecessary inhibition of stop of the drive source is reduced, energy saving is also realized.

A program updating method included in the embodiments of the present disclosure is a method of updating a control program of an on-vehicle control device which controls target equipment installed in a vehicle. The method includes: determining whether or not to permit update of the control program, by using, as a criterion, operation of a drive source of the vehicle; and performing a control to restrict stop of the drive source during permitted update of the control program.

According to this configuration, stop of the drive source during update of the control program is restricted. Thus, restart of the drive source during update of the control program is avoided. Therefore, update of the control program is prevented from being interrupted due to a voltage drop that is caused by restart of the drive source during the update, and the update program is prevented from being destroyed due to the interrupted update. As a result, the control program can be stably updated while the drive source such as an engine is being operated.

A computer program included in the embodiments of the present disclosure is a computer program for causing a computer to function as a control apparatus configured to control update of a control program of an on-vehicle control device which controls target equipment installed in a vehicle. The computer program causes the computer to function as: a determination unit configured to determine whether or not to permit update of the control program, by using, as a criterion, operation of a drive source of the vehicle; and a control unit configured to perform a control to restrict stop of the drive source during permitted update of the control program.

According to this configuration, stop of the drive source during update of the control program is restricted. Thus, restart of the drive source during update of the control program is avoided. Therefore, update of the control program is prevented from being interrupted due to a voltage drop that is caused by restart of the drive source during the update, and the update program is prevented from being destroyed due to the interrupted update. As a result, the control program can be stably updated while the drive source such as an engine is being operated.

<Detailed Description of Embodiments>

Hereinafter, preferred embodiments will be described with reference to the drawings. In the following description, the same reference numerals refer to the same components and constituent elements. The names and functions thereof are also the same. Therefore, repeated description thereof is not necessary.

<First Embodiment>

[Overall Configuration of System]

Figure 1:
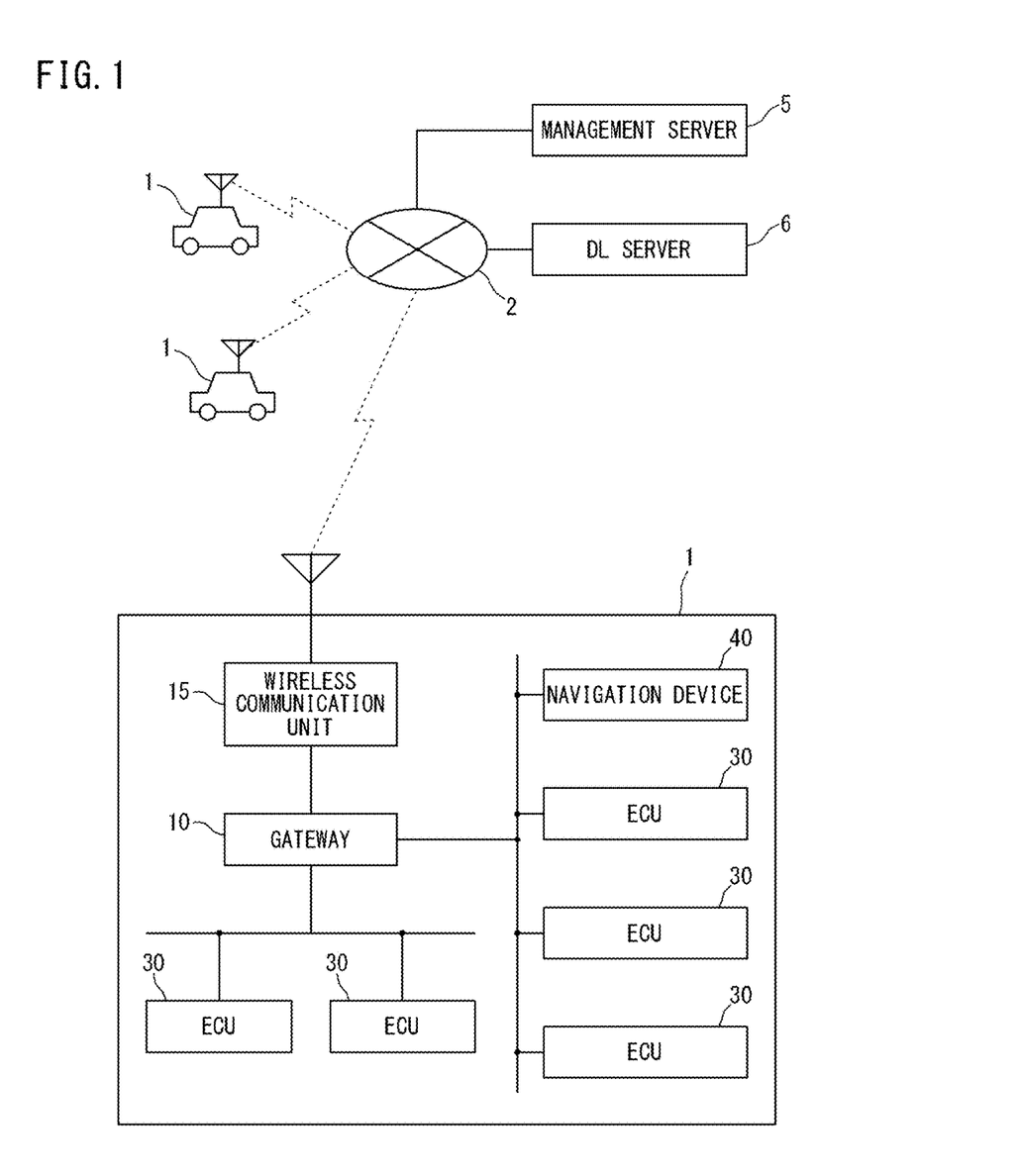
FIG. 1 is a diagram showing an overall configuration of a program updating system according to an embodiment.

FIG. 1 is a diagram showing an overall configuration of a program updating system according to a first embodiment.

As shown in FIG. 1, the program updating system of this embodiment includes vehicles 1, a management server 5, and a DL (download) server 6 which are communicable with each other via a wide-area communication network 2.

The management server 5 and the DL server 6 are operated by, for example, the automobile manufacturer of the vehicles 1, and are able to communicate with large numbers of vehicles 1 owned by users registered as members in advance.

Each vehicle 1 is equipped with a gateway 10, a wireless communication unit 15, a plurality of ECUs 30, and various on-vehicle devices (not shown) controlled by the respective ECUs 30.

A plurality of communication groups, each being formed by a plurality of ECUs 30 bus-connected to a common in-vehicle communication line, are present in each vehicle 1, and the gateway 10 relays communication between the communication groups. Therefore, a plurality of in-vehicle communication lines are connected to the gateway 10.

Preferably, as shown in FIG. 1, each vehicle 1 is further equipped with a navigation device 40, and the navigation device 40 is connected to the gateway 10 by an in-vehicle communication line. The navigation device 40 is not necessarily mounted in the vehicle 1, but may be implemented by a user's mobile communication terminal such as a smartphone, and may be communicable with the wireless communication unit 15. Alternatively, the navigation device 40 may be a server that provides navigation information, and may be communicable with the gateway 10 via the wide-area communication network 2.

The wireless communication unit 15 is communicably connected to the wide-area communication network 2 such as a mobile phone network, and is connected to the gateway 10 by an in-vehicle communication line. The gateway 10 transmits, to the ECUs 30, information received by the wireless communication unit 15 from external devices such as the management server 5 and the DL server 6 through the wide-area communication network 2.

The gateway 10 transmits information obtained from the ECUs 30 to the wireless communication unit 15, and the wireless communication unit 15 transmits the information to the external devices such as the management server 5.

As for the wireless communication unit 15 mounted in the vehicle 1, a device possessed by the user of the vehicle 1, such as a mobile phone, a smart phone, a tablet-type terminal, or a notebook PC (Personal Computer), is conceivable.

In FIG. 1, the gateway 10 communicates with the external devices via the wireless communication unit 15. However, when the gateway 10 has a function of wireless communication, the gateway 10 may be configured to perform wireless communication of the external devices such as the management server 5.

In the program updating system shown in FIG. 1, the management server 5 and the DL server 6 are configured as separate servers. However, these servers 5 and 6 may be configured as a single server unit.

[Internal Configuration of Gateway]

Figure 2:
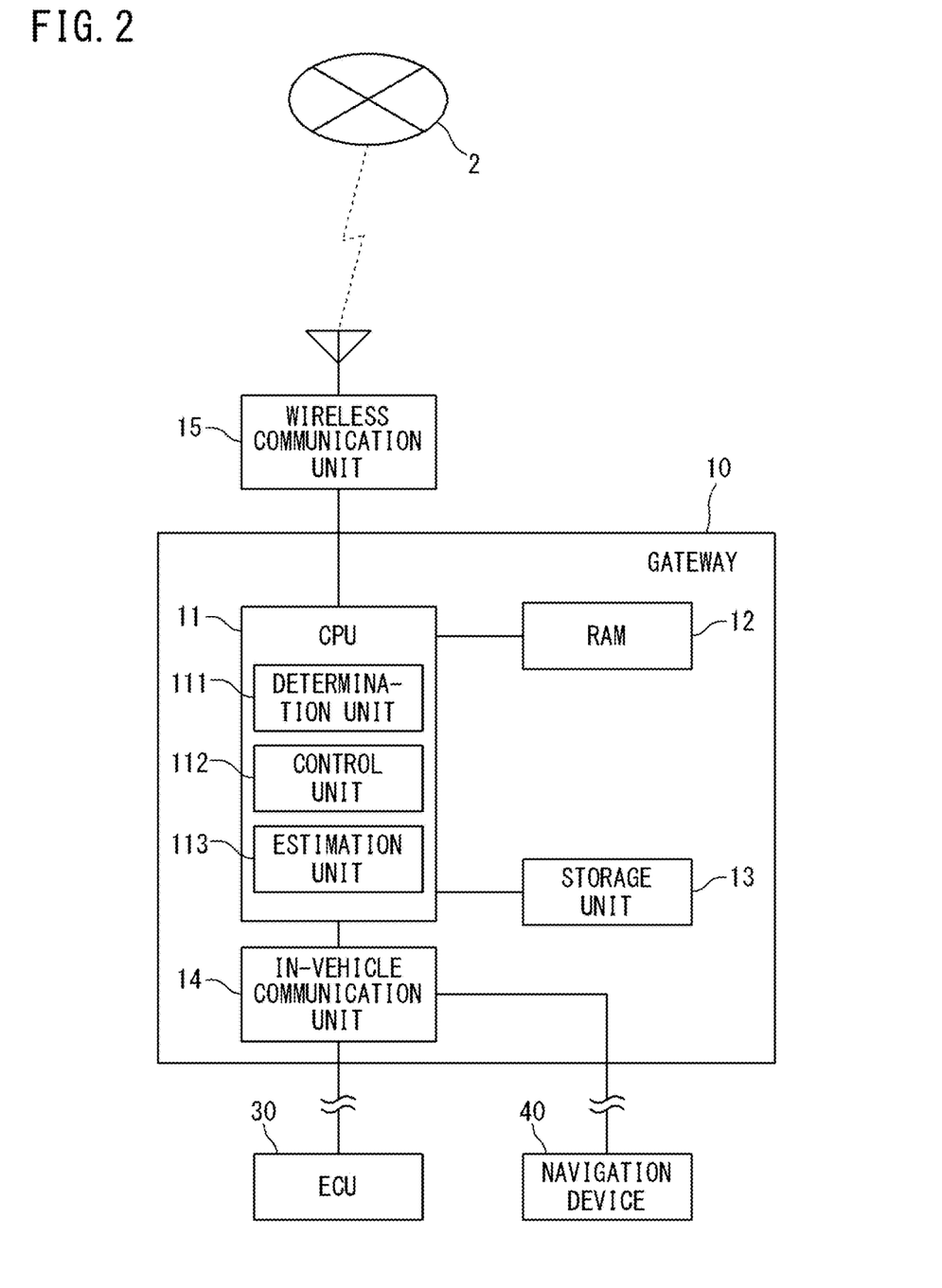
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12, and executing the read programs.

The CPU 11 can execute a plurality of programs in parallel by switching between the plurality of programs in a time-sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program to be implemented by the CPU 11 can be transferred in a state of being recorded in a well-known recording medium such as a CD-ROM or a DVD-ROM, or may be transferred by data transmission (download) from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

The storage unit 13 consists of, for example, a nonvolatile memory element such as a flash memory or an EEPROM (Electrically Erasable Programmable Read Only Memory). The storage unit 13 has a storage area in which programs to be executed by the CPU 11, data required in executing the programs, and the like are stored. In the storage unit 13, update programs of the respective ECUs 30, received from the DL server 6, and the like are also stored.

The plurality of ECUs 30 are connected to the in-vehicle communication unit 14 via the in-vehicle communication lines arranged in the vehicle 1. The in-vehicle communication unit 14 communicates with the ECUs 30 in accordance with a standard such as CAN (Controller Area Network), CANFD (CAN with Flexible Data Rate), LIN (Local Interconnect Network), Ethernet (registered trademark), or MOST (Media Oriented Systems Transport: MOST is a registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for an on-vehicle network, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay device in the vehicle 1 may be adopted. The wired communication unit has a connector to which a communication cable conforming to a standard such as USB (Universal Serial Bus) or RS232C is connected, and performs wired communication with another communication device connected thereto via the communication cable.

When the other communication device and an external device such as the management server 5 are able to perform wireless communication via the wide-area communication network 2, the external device becomes communicable with the gateway 10 through a communication path including the external device, the other communication device, the wired communication unit, and the gateway 10 in this order.

[Internal Configuration of ECU]

Figure 3:
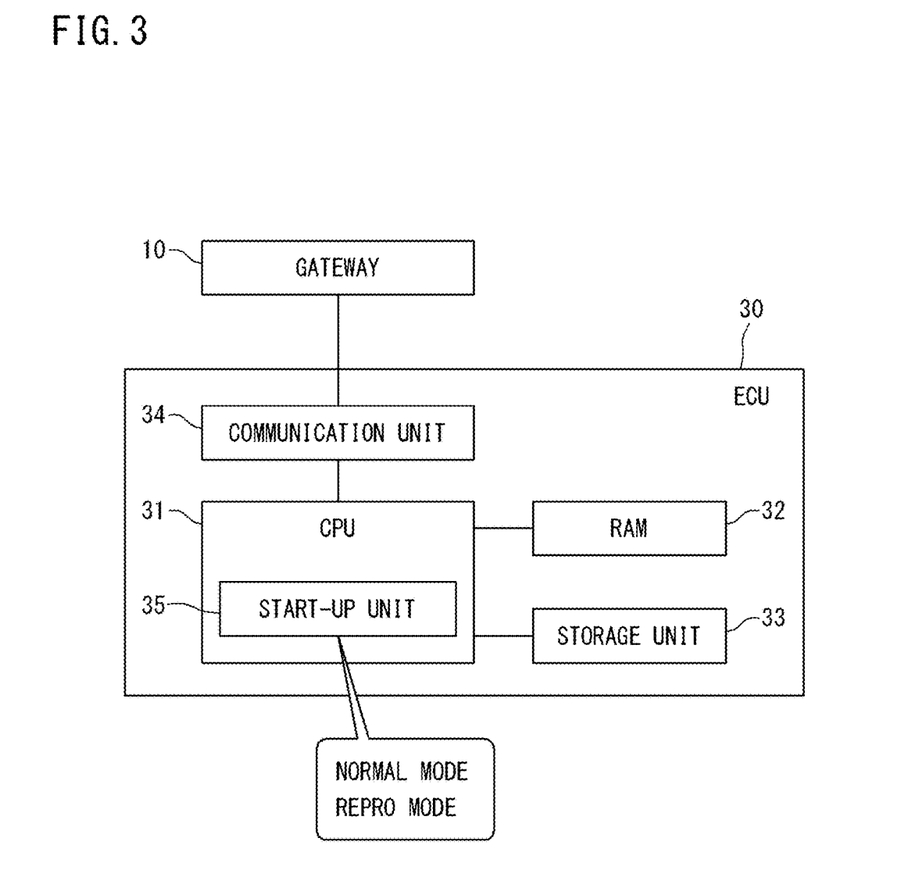
FIG. 3 is a block diagram showing an internal configuration of an ECU.

FIG. 3 is a block diagram showing an internal configuration of each ECU 30.

As shown in FIG. 3, the ECU 30 includes a CPU 31, an RAM 32, a storage unit 33, a communication unit 34, and the like. The ECUs 30 are on-vehicle control devices that individually control target equipment installed in the vehicle 1. Examples of the types of the ECUs 30 include: a control ECU for a drive source such as an engine; a steering control ECU; and a door lock control ECU.

The CPU 31 controls the operation of target equipment that the CPU 31 is in charge of, by reading out one or a plurality of programs previously stored in the storage unit 33 to the RAM 32, and executing the read programs. The CPU 31 may also be a CPU representing a plurality of CPU groups, and a control to be performed by the CPU 31 may be a control to be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

Information stored in the storage unit 33 includes, for example, a computer program (hereinafter referred to as "control program") that causes the CPU 31 to execute information processing for controlling target equipment that is an in-vehicle control target.

The gateway 10 is connected to the communication unit 34 via the in-vehicle communication line arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target equipment (e.g., engine control for a fuel engine, or door lock control for a door lock motor).

The reprogramming mode is a control mode for updating the control program used for control of the target equipment. That is, the reprogramming mode is a control mode in which the CPU 31 performs erasing/overwriting of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 causes the CPU 31 to operate with the updated control program.

In particular, an ECU (driving system control ECU) that controls a drive source, such as an engine control ECU, has stored therein a program that causes the CPU 31 to execute an automatic stop mode, as a control program to be executed by the CPU 31. The automatic stop mode is, for example, a control mode such as "idle reduction" in which the drive source is stopped when a prescribed stop condition is satisfied while the drive source is being operated, and the drive source is restarted and operated when a prescribed return condition is satisfied.

The stop condition is, for example, that a vehicle stopping time, during which the drive source such as an engine is operated with no load, has reached a predetermined time, or that a vehicle traveling time, during which the drive source is operated with no load, has reached a predetermined time. The former stop condition realizes stop of the drive source (e.g., engine stop) during idling. The latter stop condition realizes stop of the drive source during inertial traveling called "coasting". The return condition from the former stop condition is, for example, that an operation of restarting the vehicle (brake release, accelerator ON) is received after the stop of the drive source. The return condition from the latter stop condition is, for example, that an accelerator/brake operation, a steering wheel operation, or the like is received, or that the speed of the vehicle becomes equal to or lower than a predetermined speed.

[Internal Structure of Management Server]

Figure 4:
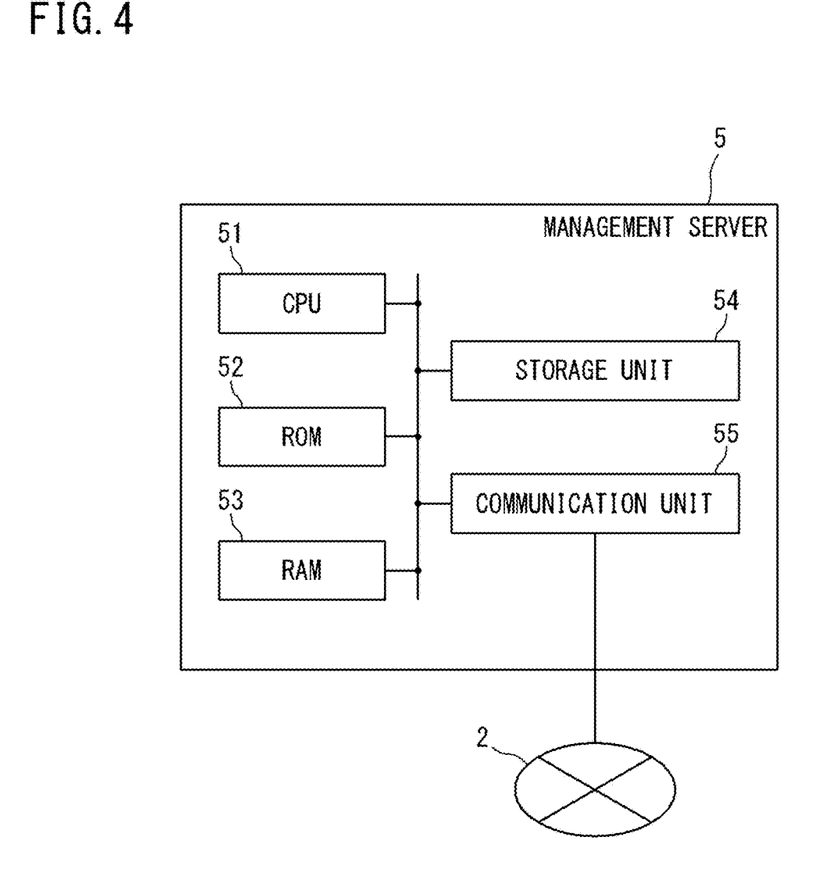
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53, and executing the read programs, the CPU 51 controls the operation of each hardware component, and causes the management server 5 to function as an external device that is able to communicate with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when being connected to the wide- area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence]

Figure 5:
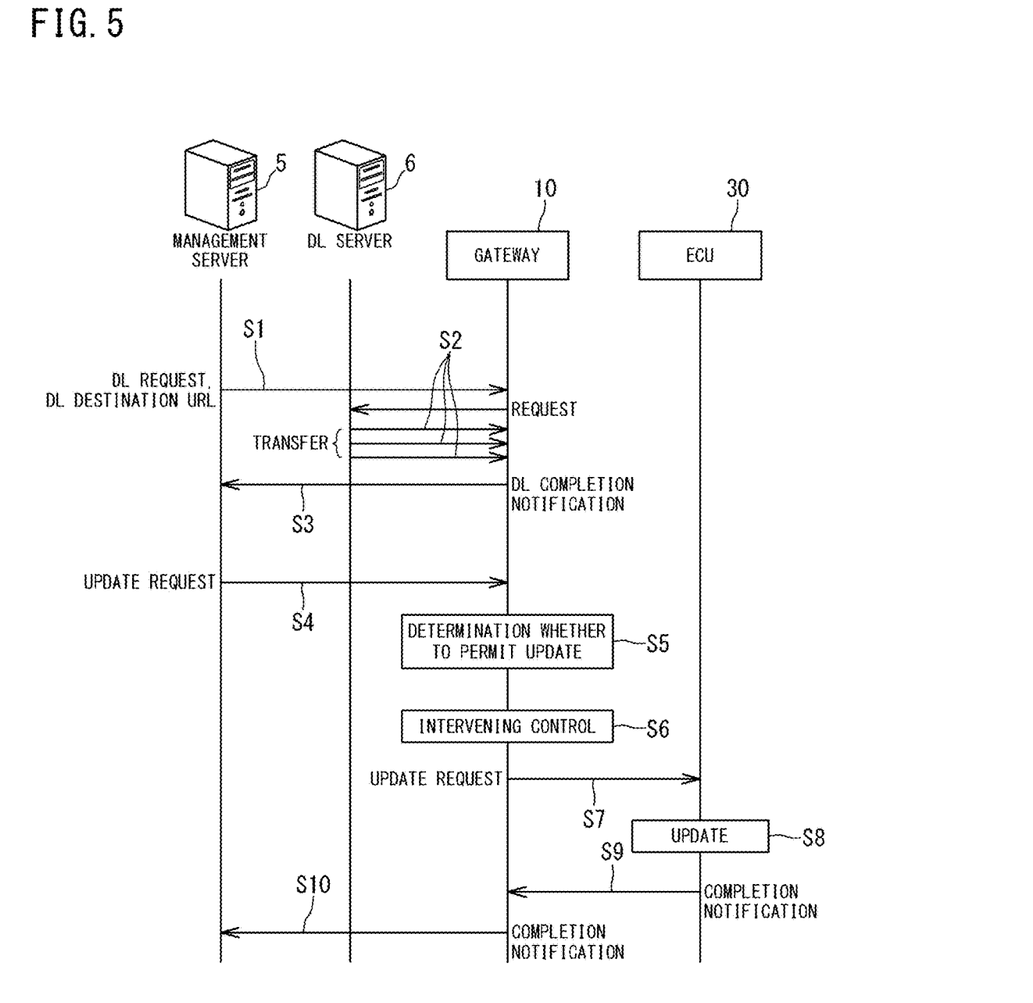
FIG. 5 is a sequence diagram showing an example of update of a control program of the ECU.

FIG. 5 is a sequence diagram showing an example of update of a control program for an ECU, which is executed in the program updating system of the present embodiment. For example, as for a vehicle 1 registered in advance, the management server 5 determines a timing to update a control program of an ECU of the vehicle 1. The timing of update may be set by, for example, the automobile manufacturer of the vehicle 1.

When the timing to update the control program of the ECU has arrived, the management server 5 transmits, to the gateway 10 of the corresponding vehicle 1, a download request and a destination URL where the update program for the ECU 30 is stored (step S1).

Thereby, the gateway 10 downloads the update program for the ECU 30 from the DL server 6 (step S2). The gateway 10 temporarily stores and retains the received update program in the storage unit 13 thereof.

When retention of the update program is completed, the gateway 10 notifies the management server 5 that the download has been normally completed (step S3). In a case where update is automatically continued, the management server 5, which has received a DL completion notification, transmits a control program update request to the gateway 10. After completion of the download, the management server 5 may interrupt the processing, and may transmit a control program update request to the gateway 10 upon receiving an update request from the outside (step S4).

The gateway 10, which has received the update request, determines whether or not to permit update of the control program, on the basis of the driving state of the drive source of the vehicle 1 (step S5). In the updating system according to the first embodiment, the gateway 10 permits update of the control program in step S5 when the drive source at present is in the driving state or when the drive source is in a driving state not lower than a prescribed threshold value. The drive source of the vehicle 1 corresponds to: an engine when the vehicle 1 is an engine vehicle which is also called a conventional vehicle; a motor when the vehicle 1 is an electric vehicle; and an engine and a motor when the vehicle 1 is a hybrid vehicle.

When update of the control program has been permitted, the gateway 10 transmits a control program update request to the corresponding ECU 30, thereby causing the ECU 30 to update the control program by using the update program stored in the storage unit 13 (step S7).

At this time, the gateway 10 executes a control (hereinafter also referred to as "intervening control") of intervening in a predetermined control of the driving system control ECU 30 whose control program is being updated (step S6). In step S7, the gateway 10 may notify the user that update of the control program is possible, and may request the ECU 30 to update the control program in accordance with a user operation that triggers the update. The intervening control in step S6 is, for example, a control to restrict automatic stop of the drive source by restricting the automatic stop mode, such as stop of the drive source during idling, while the control program is being updated. The intervening control in step S6 may be started simultaneously with the update request in step S7, or may be started in advance of the update request in step S7. Alternatively, the intervening control in step S6 may be started immediately after the update request in step S7.

Upon receiving the control program update request, the ECU 30 switches the control mode thereof from the normal mode to the repro mode. Thus, this ECU becomes able to perform update of the control program.

The ECU 30 expands the received update program and applies the update program to the old version of the control program, thereby overwriting the old version of the control program with the new version of the control program (step S8). When the overwriting is completed, the ECU 30 transmits an overwriting completion notification to the gateway 10 (step S9). Upon receiving the overwriting completion notification from the corresponding ECU 30, the gateway 10 transmits an update completion notification to the management server 5 (step S10).

[Functional Configuration of Gateway]

As functions for performing the process of determining whether or not to permit update of the control program (step S5) and the intervening control (step S6), the CPU 11 of the gateway 10 includes functions represented by a determination unit 111 and a control unit 112 in FIG. 2, respectively. These functions are implemented by the CPU 11 when the CPU 11 reads out one or a plurality of programs stored in the storage unit 13, and executes the read programs. However, at least a part of the functions may be implemented by hardware such as an electronic circuit.

The function of the CPU 11 represented by the determination unit 111 (hereinafter, this function is referred to as "determination unit 111") obtains the state of the drive source of the vehicle 1 through communication with the driving system control ECU 30. The state of the drive source includes information indicating: whether or not the drive source is being operated; or the driving amount (the number of revolutions or rotational speed per unit time).

When the drive source of the vehicle 1 is being operated at present, the determination unit 111 permits update of the control program. Preferably, the determination unit 111 permits update of the control program when the drive source is being operated and is in a prescribed driving state defined in advance. For example, if the traveling speed of a vehicle is extremely low due to traffic congestion, the vehicle may be stopped because traveling thereof is not continued. Therefore, as one example, update of the control program is permitted when the drive source is in a predetermined driving state, such as when the traveling speed is not lower than a predetermined speed.

At prescribed timings such as predetermined time intervals, the determination unit 111 determines whether or not to permit update of the control program at present time. Thus, the determination unit 111 determines a timing to start update of the control program, in other words, a position, in a traveling route of the vehicle 1, at which update of the control program should be started (hereinafter, also referred to as "start position").

The function of the CPU 11 represented by the control unit 112 (hereinafter, this function is referred to as "control unit 112") restricts stop of the drive source in the automatic stop mode during update of the control program. As one example, the control unit 112 completely inhibits stop of the drive source in the automatic stop mode while the control program is being updated. Thus, while the control program is being updated, the drive source is not stopped due to the automatic stop mode, and maintains the operating state. Therefore, restart of the drive source is not performed during update of the control program.

Preferably, the control unit 112 executes the intervening control in accordance with the type of the automatic stop mode. As one example, the control unit 112 determines whether the automatic stop mode during update of the control program is an automatic stop mode aimed at energy saving or an automatic stop mode in terms of safety. When the automatic stop mode is the former, the control unit 112 inhibits stop of the drive source. For example, as for the automatic stop mode aimed at energy saving, such as the aforementioned stop of the drive source during idle reduction or stop of the drive source during coasting, there is no problem regarding safety even if the stop of the drive source is inhibited. On the other hand, when abnormal combustion occurs in the engine and may damage the engine itself, inhibiting the stop of the drive source should not be allowed in terms of safety.

When executing the intervening control, the control unit 112 outputs, to the driving system control ECU 30, a control signal that inhibits the automatic stop mode. In accordance with this control signal, the CPU 31 of the driving system control ECU 30 inhibits execution of the automatic stop mode. That is, in this case, the CPU 31 of the driving system control ECU 30 is also regarded as a control unit.

[Determination Whether or not to Permit Update of Control Program, and Intervening Control]

Figure 6:
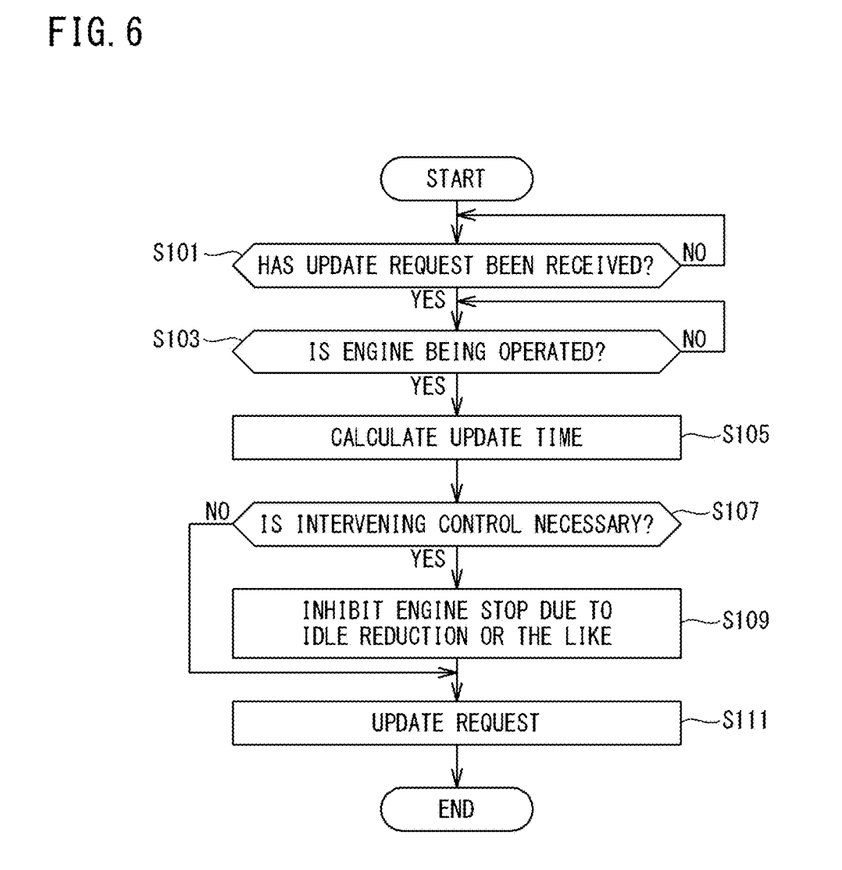
FIG. 6 is a flowchart showing the specific contents of a process of determining whether or not to permit update of a control program (step S5 in FIG. 5), and a process of intervening control (step S7 in FIG. 5), in the program updating system according to the first embodiment.

FIG. 6 is a flowchart showing the specific contents of the process of determining whether or not to permit update of the control program (step S5 in FIG. 5), and the process of the intervening control (step S7 in FIG. 5). The processes shown in the flowchart of FIG. 6 are executed mainly by the CPU 11 of the gateway 10 when the CPU 11 reads out one or a plurality of programs stored in the storage unit 13 to the RAM 12, and executes the read programs.

With reference to FIG. 6, upon receiving a control program update request from the management server 5 (YES in step S101), the CPU 11 of the gateway 10 determines whether or not the drive source of the vehicle 1 is being operated (step S103). When the drive source is being operated (YES in step S103), the CPU 11 executes the intervening control (step S109), and permits update of the control program in the ECU 30. Therefore, the CPU 11 requests the ECU 30 to update the control program (step S111). In step S109, the CPU 11 inhibits stop of the drive source in the automatic stop mode during update of the control program. Alternatively, the CPU 11 inhibits stop of the drive source in a prescribed type of automatic stop mode during update of the control program. These inhibitions may be collectively expressed as restriction of stop of the drive source.

[Effect of First Embodiment]

According to the program updating system of the first embodiment, the control program is updated while the drive source of the vehicle 1 is being operated, for example, while the engine of the vehicle 1 is being operated. Furthermore, automatic stop of the drive source, such as engine stop during idling, is inhibited during the update. Thus, restart of the drive source during update of the control program is avoided. Therefore, a voltage drop during update of the control program can be avoided, thereby achieving stable update of the control program. That is, update of the control program is prevented from being interrupted due to a voltage drop that occurs during the update, and the update program is prevented from being destroyed due to the interrupted update.

<Second Embodiment>

Preferably, the CPU 11 of the gateway 10 provides an exception in the intervening control in accordance with a load regarding update of a control program. As one example, the CPU 11 does not perform the intervening control during update of a control program whose update time is not longer than a prescribed time. The prescribed time is about 30 seconds, for example.

In this case, as shown in FIG. 6, when the CPU 11 has determined that the drive source is being operated (YES in step S103) and has determined to permit update, the CPU 11 calculates an update time that is a time required for the update (step S105). The update time may be obtained from the management server 5. Then, the CPU 11 determines whether or not to perform the intervening control, by comparing the update time with a threshold value stored in advance (step S107). For example, when the update time is extremely short, such as less than 30 seconds, the likelihood that the drive source is automatically stopped during update and then restarted is low. Therefore, the CPU 11 stores in advance a threshold value of about 30 seconds, for example. When the calculated update time is shorter than the threshold value (NO in step S107), the CPU 11 determines that the intervening control is not necessary, and skips the intervening control in step S109.

A load regarding update of the control program may be calculated while taking into account the size of the update program, the ability of the target ECU 30, etc., instead of or in combination with the update time.

[Effect of Second Embodiment]

Since the exception is provided in execution of the intervening control, simplified and efficient control can be realized. In addition, since unnecessary inhibition of automatic stop of the drive source is reduced, energy saving is also realized.

<Third Embodiment>

If the automatic stop mode during update of the control program is restricted as in the first and second embodiments, energy saving may not be sufficiently achieved. In a program updating system according to this third embodiment, a start position is determined so that the number of times or the period of inhibiting stop of the drive source is reduced.

The CPU 11 of the gateway 10 according to the third embodiment further includes a function represented by an estimation unit 113 in FIG. 2. The estimation unit 113 is also a function implemented in the CPU 11 when the CPU 11 reads out one or a plurality of programs stored in the storage unit 13, and executes the read programs. However, this function may also be implemented by hardware such as an electronic circuit.

The function of the CPU 11 represented by the estimation unit 113 (hereinafter, this function is referred to as "estimation unit 113") estimates a position, in a predicted traveling route (also referred to as "predicted route") of the vehicle 1, at which the drive source may stop due to the automatic stop mode. The estimated position at which the drive source may stop is also referred to as an estimated stop position.

As one example, the estimation unit 113 obtains information indicating a route set in the navigation device 40, through communication between the gateway 10 and the navigation device 40. This route is regarded as a predicted route. As another example, the estimation unit 113 may obtain map information through communication with an information providing server (not shown), obtain the present position from a GPS (Global Positioning System), and estimate a route by using the map information and the present position. For example, in a case where the present position is on a freeway and the freeway continues on without branching, the estimation unit 113 estimates that the predicted route is on the freeway.

The estimation unit 113 obtains information (estimation information) used for obtaining an estimated stop position. Examples of the estimation information include map information, topographic information, and traffic information indicating traffic congestion, traffic regulation, etc. The estimation unit 113 obtains these pieces of information through communication with an information providing server (not shown), and estimates a stop position of the drive source by using these pieces of information.

Figure 7:
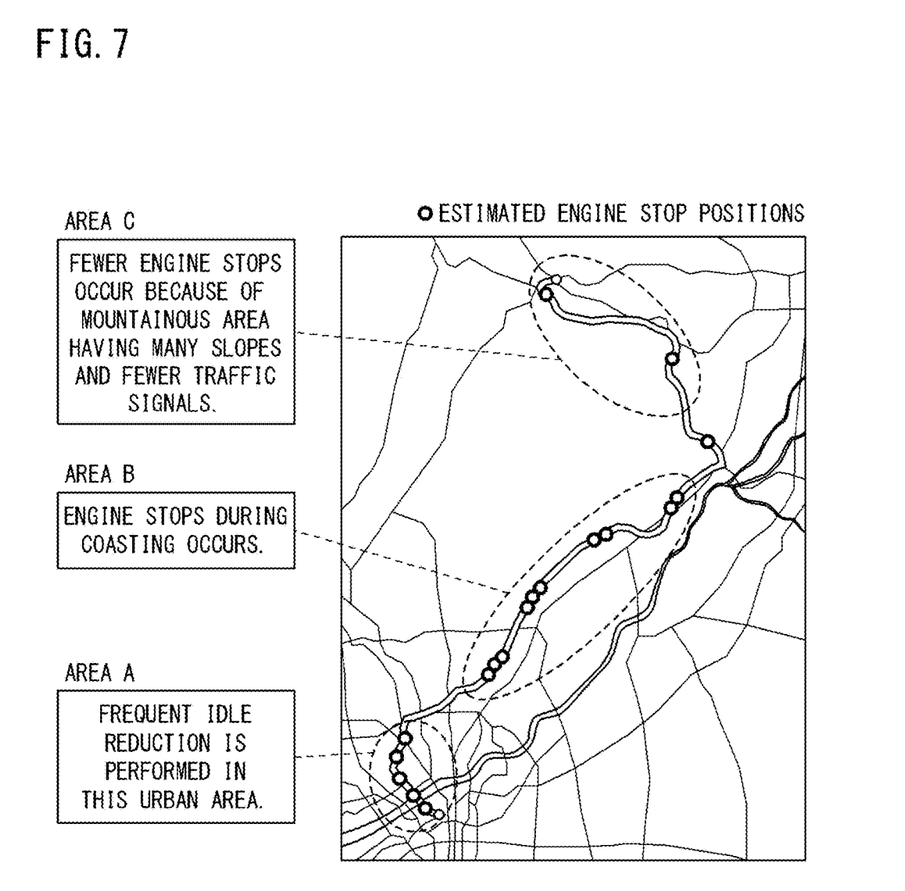
FIG. 7 is a diagram for explaining estimated stop positions.

FIG. 7 is a diagram for explaining estimated stop positions. FIG. 7 shows: route information set in the navigation device 40 of the vehicle 1; topographic information (map information); and information obtained from traffic information. The estimation unit 113 specifies, for example, the topography of the estimated route by combining these pieces of information. In FIG. 7, round marks on the map represent estimated stop positions, and the stop positions in areas A to C are estimated as follows.

The area A in FIG. 7 is an urban area. As for whether or not an area is an urban area, the estimation unit 113 may previously store therein information (e.g., address, latitude and longitude, etc.) for specifying an urban area. Alternatively, the estimation unit 113 may specify an urban area by comparing the number of traffic signals, the number of intersections, the widths of roads, the density of roads, etc., which are indicated by the map information, with threshold values thereof for defining the urban area which are stored in advance. When a vehicle travels in an urban area, it is assumed that the vehicle frequently stops at traffic signals and performs idle reduction. That is, at each traffic signal, the vehicle may perform idle reduction, and thus the drive source may be stopped. Therefore, as for the route included in the area A which is an urban area, the estimation unit 113 sets, as estimated stop positions, the intersections or the points where the traffic signals are installed, for example. Furthermore, by combining the traffic information with the map information, the estimation unit 113 may set, as an estimated stop position, a point between traffic signals (or intersections) on the road when traffic congestion occurs or traffic regulation is imposed near the vehicle.

A road as an estimated route included in the area B in FIG. 7 has fewer traffic signals and fewer gradients and curves. When a vehicle travels a certain distance along a road having a gentle downward gradient and having no curves, the vehicle is likely to perform inertia traveling called "coasting". In the automatic stop mode, the drive source is stopped during coasting, for example. As one example, the estimation unit 113 regards a point on the road as the estimated route included in the area B, at which the distance of a section where the gradient and the curvature do not change reaches a prescribed distance, as a point from which the vehicle starts coasting, and sets this point as an estimated stop position.

A road as an estimated route included in the area C in FIG. 7 is a road in a mountainous area having many gradients and curves. When a vehicle travels on a road having a large gradient and many curves, the drive source generally maintains the operating state. As one example, the estimation unit 113 sets, as an estimated stop position, an intersection or a point where a traffic signal is installed on the road as the estimated route included in the area C.

The determination unit 111 determines a start position so that the number of the estimated stop positions included in a section where the vehicle 1 travels during update (this section is also referred to as "update section") is minimized. The update section is a section which starts from the start position and in which the vehicle 1 travels from the start point until update of the control program is completed.

When the estimated stop positions are as shown in FIG. 7, the determination unit 111 determines a point in the area C as a start position. If a point in the area A or B having many estimated stop positions is determined as a start position, an estimated stop position is highly likely to be included in the update section. On the other hand, when a point in the area C having fewer estimated stop positions is determined as a start position, an estimated stop position is unlikely to be included in the update section. Therefore, when a point in the area C is determined as a start position, the likelihood that stop of the drive source is inhibited can be reduced. In other words, if update is started in the area A or B, the likelihood that stop of the drive source is inhibited is increased, whereby energy saving is impaired.

Preferably, the estimation unit 113 estimates an update section by using the update time of the control program, and determines a start position so that the number of estimated stop positions included in the estimated update section is minimized. For example, although the area B includes many estimated stop positions, there is a section where the distance between adjacent estimated stop positions is large in the area B. Therefore, when the distance between adjacent estimated stop positions in the area B is larger than the estimated update section, the estimation unit 113 may set, as a start position, a point in the section where the distance between adjacent estimated stop positions is large in the area B.

Figure 8:
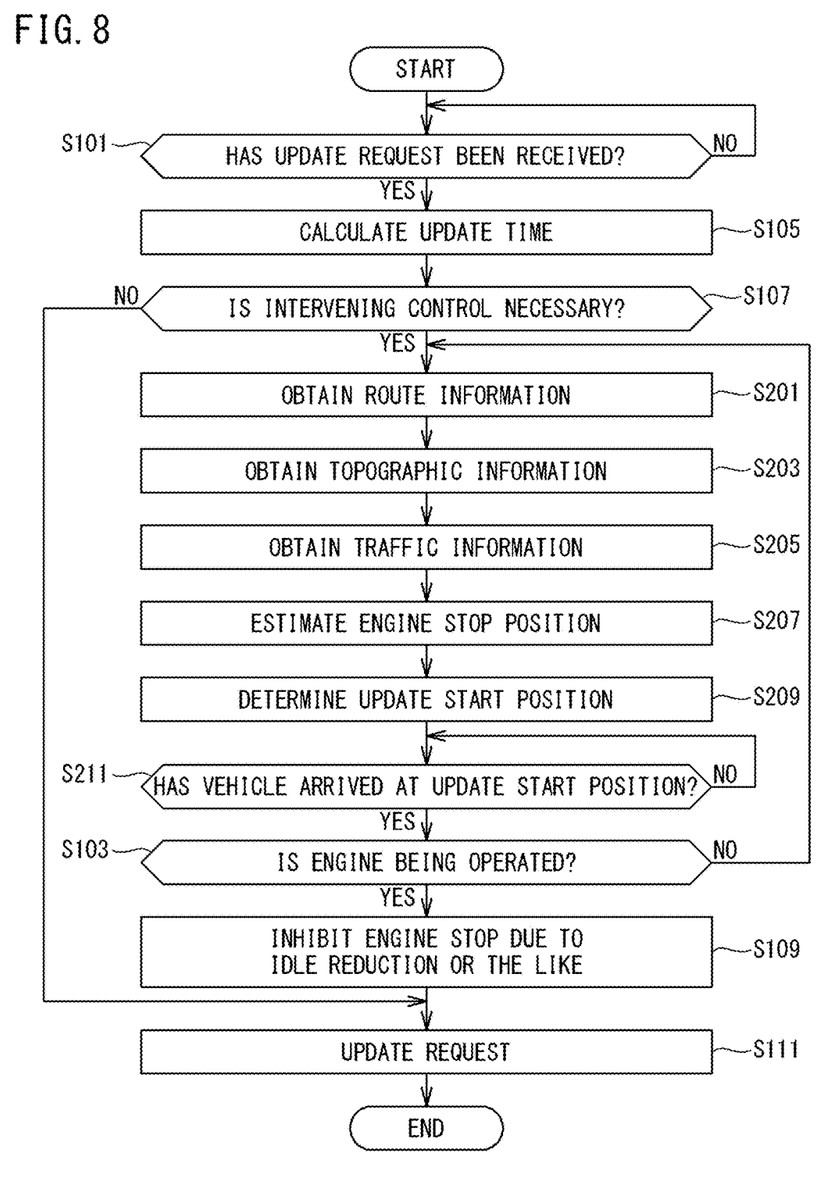
FIG. 8 is a flowchart showing the specific contents of a process of determining whether or not to permit update of a control program (step S5 in FIG. 5), and a process of intervening control (step S7 in FIG. 5), in a program updating system according to a third embodiment.

FIG. 8 is a flowchart showing the specific contents of the process of determining whether or not to permit update of the control program (step S5 in FIG. 5), and the process of the intervening control (step S7 in FIG. 5), in the program updating system according to the third embodiment. The processes shown in the flowchart of FIG. 8 are also executed mainly by the CPU 11 of the gateway 10 when the CPU 11 reads out one or a plurality of programs stored in the storage unit 13 to the RAM 12, and executes the read programs. In the flowchart of FIG. 8, processes to which the same step numbers as those in the flowchart of FIG. 6 are given are the same processes as those in the flowchart of FIG. 6, and therefore, repeated description is not necessary.

With reference to FIG. 8, upon receiving a control program update request from the management server 5 (YES in step S101), the CPU 11 of the gateway 10 according to the third embodiment executes processes for obtaining estimated stop positions (steps S201 to S207). The processes for obtaining estimated stop positions are as follows. As one example, the CPU 11 obtains information indicating an estimated route, through communication with the navigation device 40 (step S201). Next, the CPU 11 obtains topographic information, traffic information, etc., regarding the estimated route, through communication with a server that provides these pieces of information (steps S203, S205). Using these pieces of information, the CPU 11 specifies estimated stop positions on the estimated route as described above (step S207). Then, based on the estimated stop positions, the CPU 11 determines a start position (step S209).

Thereafter, the CPU 11 observes traveling of the vehicle 1, and obtains the present position. The present position can be calculated based on, for example, the driving amount obtained from the ECU that controls the drive source. Alternatively, the present position may be obtained from a GPS.

Upon detecting that the present position has become the start position, that is, upon detecting that the vehicle 1 has arrived at the start position (YES in step 211), the CPU 11 determines whether or not the drive source of the vehicle 1 is being operated (step S103). When the drive source is being operated (YES in step S103), the CPU 11 executes the intervening control (step S109), and permits update of the control program in the ECU 30. Therefore, the CPU 11 requests the ECU 30 to update the control program (step 5111).

Also in this third embodiment, as in the second embodiment, an exception may be provided in the intervening control in accordance with a load regarding update of the control program. That is, when the update time calculated in step S105 is shorter than the threshold value (NO in step S107), update of the control program is permitted without determining a start position through the processes in steps 5201 to 5209, and without necessity of the intervening control.

[Effect of Third Embodiment]

According to the program updating system of the third embodiment, automatic stop of the drive source, such as engine stop during idling, is inhibited during update of the control program. Furthermore, the period, during which stop of the drive source is inhibited, can be reduced. Therefore, both stable update of the control program and energy saving can be achieved.

<Fourth Embodiment>

In the program updating systems according to the first to third embodiments, the gateway 10 executes the determination whether or not to permit update of the control program, and the intervening control. Therefore, the CPU 11 of the gateway 10 has the functions represented by the determination unit 111 and the control unit 112 shown in FIG. 2. Furthermore, as described in the third embodiment, in the case where whether or not to permit update of the control program is determined based on estimated stop positions, the CPU 11 of the gateway 10 further includes the function represented by the estimation unit 113 shown in FIG. 2.

However, the determination whether or not to permit update of the control program, and the intervening control may be performed by a device other than the gateway 10. In another example, these processes may be performed by the management server 5. In this case, the management server 5 determines whether or not to permit update of the control program, in advance of instructing the gateway 10 to update the control program in step S4 in FIG. 5, and thereafter, executes the intervening control.

In this case, the CPU 51 of the management server 5 has the functions represented by the determination unit 111 and the control unit 112 in FIG. 2. In addition, the CPU 51 may have the function represented by the estimation unit 113 in FIG. 2. These functions are mainly implemented by the CPU 51 when the CPU 51 reads out one or a plurality of programs stored in the ROM 52, and executes the read programs. However, at least a part of the functions may be implemented by hardware such as an electronic circuit.

In this example, the CPU 51 obtains information indicating the state of the drive source (i.e., whether or not the drive source is being operated) through communication of the gateway 10 of the target vehicle 1. Based on the obtained information, the CPU 51 determines whether or not to permit update of the control program. In addition, the CPU 51 is allowed to obtain information indicating an estimated route through communication with the gateway 10 of the target vehicle 1 or through communication with the navigation device 40 installed in the vehicle 1, thereby obtaining estimated stop positions. Based on these pieces of information, the CPU 51 determines whether or not to permit update of the control program.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
5 management server (control apparatus)
6 DL server
10 gateway (control apparatus)
11 CPU
12 RAM
13 storage unit
14 in-vehicle communication unit
15 wireless communication unit
30 ECU (on-vehicle control device)
31 CPU
32 RAM
33 storage unit
34 communication unit
35 start-up unit
40 navigation device
51 CPU
52 ROM
53 RAM
54 storage unit
55 communication unit
111 determination unit
112 control unit
113 estimation unit

The invention claimed is:

1. A control apparatus configured to control update of a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the control apparatus comprising:
a determination unit configured to determine whether or not to permit update of the control program, by using, as a criterion, operation of a drive source of the vehicle; and
a control unit configured to perform an intervening control to restrict execution of the automatic stop mode by the driving system control device during permitted update of the control program, wherein
when an update time of the control program is not longer than a predetermined vaule, the control unit performs a control to restrict execution of the intervening control during update of the control program.

2. The control apparatus according to claim 1, wherein the determination unit permits update of the control program in a case where the drive source is being operated at present.

3. The control apparatus according to claim 1, wherein the determination unit does not permit update of the control program, at an estimated stop position which is a position, on a predicted traveling route, where the drive source is estimated to be stopped.

4. The control apparatus according to claim 3, wherein the estimated stop position is a position where the drive source is estimated to be stopped, based on map information of the traveling route, and information indicating a topography of the traveling route.

5. The control apparatus according to claim 4, wherein the estimated stop position is a position where the drive source is estimated to be stopped, further based on traffic information of the traveling route.

6. The control apparatus according to claim 1, wherein
the determination unit permits update of the control program at a start position of a section where the number of estimated stop positions, at which the drive source is estimated to be stopped, is minimized, the section being included in a predicted traveling route, the vehicle being estimated to travel in the section during update of the control program.

7. A non-transitory computer readable storage medium storing a computer program for causing a computer to function as a control apparatus configured to control update of a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the computer program causing the computer to function as:
a determination unit configured to determine whether or not to permit update of the control program, by using, as a criterion, operation of the drive source of the vehicle; and
a control unit configured to perform an intervening control to restrict execution of the automatic stop mode by the driving system control device during permitted update of the control program, wherein
the determination unit permits update of the control program at a start position of a section where the number of estimated stop positions, at which the drive source is estimated to be stopped, is minimized, the section being included in a predicted traveling route, the vehicle being estimated to travel in the section during update of the control program.

8. A method of updating a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the method comprising:
a first step determining whether or not to permit update of the control program, by using, as a criterion, operation of a drive source of the vehicle; and
a second stop of performing an intervening control to restrict execution of the automatic stop mode by the driving system control device during permitted update of the control program, wherein
in the second step, when an update time of the control program is not longer than a predtermined value, a control to restrict execution of the intervening control during update of the control program is performed.

9. A non-transitory computer readable storage medium storing a computer program for causing a computer to function as a control apparatus configured to control update of a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the computer program causing the computer to function as:
a determination unit configured to determine whether or not to permit update of the control program, by using, as a criterion, operation of a drive source of the vehicle; and
a control unit configured to perform an intervening control to restrict execution of the automatic stop mode by the driving system control device during permitted update of the control program, wherein
when an update time of the control program is not longer than a predetermined vaule, the control unit performs a control to restrict execution of the intervening control during update of the control program.

10. A control apparatus configured to control update of a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the control apparatus comprising:
a determination unit configured to determine whether or not to permit update of the control program, by using, as a criterion, operation of the drive source of the vehicle; and
a control unit configured to perform an intervening control to restrict execution of the automatic stop mode by the driving system control device during permitted update of the control program, wherein
the determination unit does not permit update of the control program, at an estimated stop position which is a position, on a predicted traveling route, where the drive source is estimated to be stopped.

11. A method of updating a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the method including:
a first step of determining whether or not to permit update of the control program, by using, as a criterion, operation of the drive source of the vehicle; and
a second step of performing an intervening control to restrict execution of the automatic stop mode by the driving system control device during permitted update of the control program, wherein
in the first step, update of the control program is not permitted at an estimated stop position which is a position, on a predicted traveling route, where the drive source is estimated to be stopped.

12. A non-transitory computer readable storage medium storing a computer program for causing a computer to function as a control apparatus configured to control update of a control program of an on-vehicle control device which controls target equipment installed in a vehicle,
the on-vehicle control device including a driving system control device which is able to execute an automatic stop mode in which a drive source is automatically stopped when a predetermined stop condition is satisfied,
the computer program causing the computer to function as:

a determination unit configured to determine whether or not to permit update of the control program, by using, as a criterion, operation of the drive source of the vehicle; and a control unit configured to perform an intervening control to restrict execution of the automatic stop mode by the driving system control device during permitted update of the control program, wherein the determination unit does not permit update of the control program, at an estimated stop position which is a position, on a predicted traveling route, where the drive source is estimated to be stopped.

13. A control apparatus configured to control update of a control program of an on-vehicle control device which controls target equipment installed in a vehicle, the on-vehicle control device including a driving system control device which is able to execute an automatic stop mode in which a drive source is automatically stopped when a predetermined stop condition is satisfied, the control apparatus comprising:

a determination unit configured to determine whether or not to permit update of the control program, by using, as a criterion, operation of the drive source of the vehicle; and a control unit configured to perform an intervening control to restrict execution of the automatic stop mode by the driving system control device during permitted update of the control program, wherein the determination unit permits update of the control program at a start position of a section where the number of estimated stop positions, at which the drive source is estimated to be stopped, is minimized, the section being included in a predicted traveling route, the vehicle being estimated to travel in the section during update of the control program.

14. A method of updating a control program of an on-vehicle control device which controls target equipment installed in a vehicle, the on-vehicle control device including a driving system control device which is able to execute an automatic stop mode in which a drive source is automatically stopped when a predetermined stop condition is satisfied, the method including:

a first step of determining whether or not to permit update of the control program, by using, as a criterion, operation of the drive source of the vehicle; and a second step of performing an intervening control to restrict execution of the automatic stop mode by the driving system control device during permitted update of the control program, wherein in the first step, update of the control program is permitted at a start position of a section where the number of estimated stop positions, at which the drive source is estimated to be stopped, is minimized, the section being included in a predicted traveling route, the vehicle being estimated to travel in the section during update of the control program.

* * * * *